United States Patent
Janakiraman et al.

(10) Patent No.: US 9,888,143 B1
(45) Date of Patent: Feb. 6, 2018

(54) TIMED IMAGE DELETION FROM A PERSONAL ELECTRONIC DEVICE

(71) Applicant: INTERNATIONAL BUSINESS MACHINES CORPORATION, Armonk, NY (US)

(72) Inventors: Janani Janakiraman, Austin, TX (US); Anubhav Sarkar, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/351,531

(22) Filed: Nov. 15, 2016

(51) Int. Cl.
| | |
|---|---|
| *H04N 1/21* | (2006.01) |
| *G06T 7/00* | (2017.01) |
| *G06F 3/06* | (2006.01) |
| *G06F 17/30* | (2006.01) |
| *H04N 5/232* | (2006.01) |

(52) U.S. Cl.
CPC ......... *H04N 1/2112* (2013.01); *G06F 3/0652* (2013.01); *G06F 17/30117* (2013.01); *G06T 7/0002* (2013.01); *H04N 5/23216* (2013.01); *H04N 5/23229* (2013.01); *G06T 2207/20081* (2013.01); *H04N 2201/0084* (2013.01); *H04N 2201/218* (2013.01)

(58) Field of Classification Search
CPC .... H04N 1/21–1/2195; H04N 5/23216; H04N 5/23219; H04N 5/00; G06F 17/30117–17/30123
See application file for complete search history.

(56) References Cited

U.S. PATENT DOCUMENTS

| | | |
|---|---|---|
| 9,219,830 B1 | 12/2015 | Ciorba et al. |
| 9,237,202 B1 | 1/2016 | Sehn |
| 2003/0012547 A1* | 1/2003 | Naruto ................... H04N 5/772 386/241 |
| 2007/0129058 A1 | 6/2007 | Landschaft et al. |
| 2008/0263449 A1 | 10/2008 | Schwartz et al. |
| 2014/0329510 A1 | 11/2014 | Cao et al. |
| 2015/0261969 A1 | 9/2015 | Frost |

(Continued)

OTHER PUBLICATIONS

Digital Inspiration "How to Delete the Useless Photos in your Whats App Automatically" retrieved from: http://www.labnol.org/internet/whatsapp-photo-delete/29132/ on Dec. 25, 2016; 3 pgs.

(Continued)

*Primary Examiner* — Paul Berardesca
(74) *Attorney, Agent, or Firm* — Cantor Colburn LLP

(57) ABSTRACT

Methods, systems and computer program products for timed deletion of images from a personal electronic device are provided. Aspects include receiving, by a processing unit of the personal electronic device, an image from a camera of the personal electronic device. Aspects also include storing, by the processing unit, the image in a first location in a memory of the personal electronic device. Aspects further include storing, by the processing unit, an indication of an expiration time for the image in the memory of the personal electronic device. Aspects also include removing, by the processing unit, the image from the first location in the memory based on a determination that a current time has passed the expiration time.

12 Claims, 5 Drawing Sheets

(56) References Cited

U.S. PATENT DOCUMENTS

| | | | |
|---|---|---|---|
| 2016/0073036 A1* | 3/2016 | Chen | H04N 5/23293 |
| | | | 348/231.2 |
| 2016/0099901 A1* | 4/2016 | Allen | H04L 51/10 |
| | | | 709/206 |
| 2017/0046017 A1* | 2/2017 | Bhide | G06F 3/04847 |

OTHER PUBLICATIONS

Gil, Lori "The best apps for quickly deleting iPhone photos" retrieved from: http://www.idownloadblog.com/2015/01/15/best-apps-delete-iphone-photos/ dated Jan. 15, 2015; 13 pgs.

* cited by examiner

TIMED IMAGE DELETION FROM A PERSONAL ELECTRONIC DEVICE

BACKGROUND

The present invention generally relates to managing images stored on personal electronic devices, and more particularly to methods and systems for timed deletion of images from personal electronic devices.

The use of smartphones, and other similar personal electronic devices, to take pictures has increased dramatically in recent years. As the quality of the cameras on personal electronic devices improve, the image files that are created by the cameras consume more storage space. Since individuals have their smartphone on hand often, they end up taking more and more photographs, which may result in using a large amount of the storage capacity of their smartphone. Often, photographs are taken by individuals to jot down quick notes that are only useful for a certain period. For example, a user may take a photograph to remind them of where they parked their car, a photograph of a concert or movie ticket which will be redeemed later that night, or a photograph of a document that a friend requests. Such photographs may only be important for a short period of time and afterward the images simply take up storage space.

In general, photographs taken by smartphones, or other similar personal electronic devices, remain on the personal electronic device until the user deletes the photographs, thereby freeing up storage space on the device. Often, people only review and delete unwanted images from their device once the device runs out of storage space. This situation can be frustrating to the user and can result in the user having to review and delete images from their device at an inopportune time.

SUMMARY

In accordance with an embodiment, a method for timed deletion of images from a personal electronic device is provided. for timed deletion of images from a personal electronic device are provided. The method includes receiving, by a processing unit of the personal electronic device, an image from a camera of the personal electronic device. The method also includes storing, by the processing unit, the image in a first location in a memory of the personal electronic device. The method further includes storing, by the processing unit, an indication of an expiration time for the image in the memory of the personal electronic device. The method also includes removing, by the processing unit, the image from the first location in the memory based on a determination that a current time has passed the expiration time.

In accordance with another embodiment, a computer program product for timed deletion of images from a personal electronic device is provided. The computer program product includes a non-transitory storage medium readable by a processing circuit and storing instructions for execution by the processing circuit for performing a method. The method includes receiving an image from a camera of the personal electronic device. The method also includes storing the image in a first location in a memory of the personal electronic device. The method further includes storing, an indication of an expiration time for the image in the memory of the personal electronic device. The method also includes removing the image from the first location in the memory based on a determination that a current time has passed the expiration time.

In accordance with another embodiment, a personal electronic device includes a memory and a camera that are in communication with a processing unit. The processing unit configured to receive an image from the camera and to store the image in a first location in the memory. The processing unit is further configured to store an indication of an expiration time for the image in the memory and to remove the image from the first location in the memory based on a determination that a current time has passed the expiration time.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for timed deletion of images from personal electronic devices. In exemplary embodiments, when an image is captured by a personal electronic device it is tagged by the user for automatic deletion after a desired time period, which can be specified by the user. Once the desired time period has passed, the personal electronic device can delete the image. In exemplary embodiments, deleting the image can include permanently removing the image from the personal electronic device or moving the image to a deleted items folder.

In exemplary embodiments, the personal electronic device is configured to analyze images stored on the personal electronic device to detect elements in the images that indicate that the image will be unnecessary after a period of time. Once an image is identified having a limited useful life, the image is automatically tagged for deletion. In one embodiment, the tagged images can be moved to a tagged for deletion folder where the user can review these images before the images are deleted from the personal electronic device. During the review of the images in the tagged for deletion folder, the user can revoke the deletion tags and move the images back to another folder.

Figure 1:
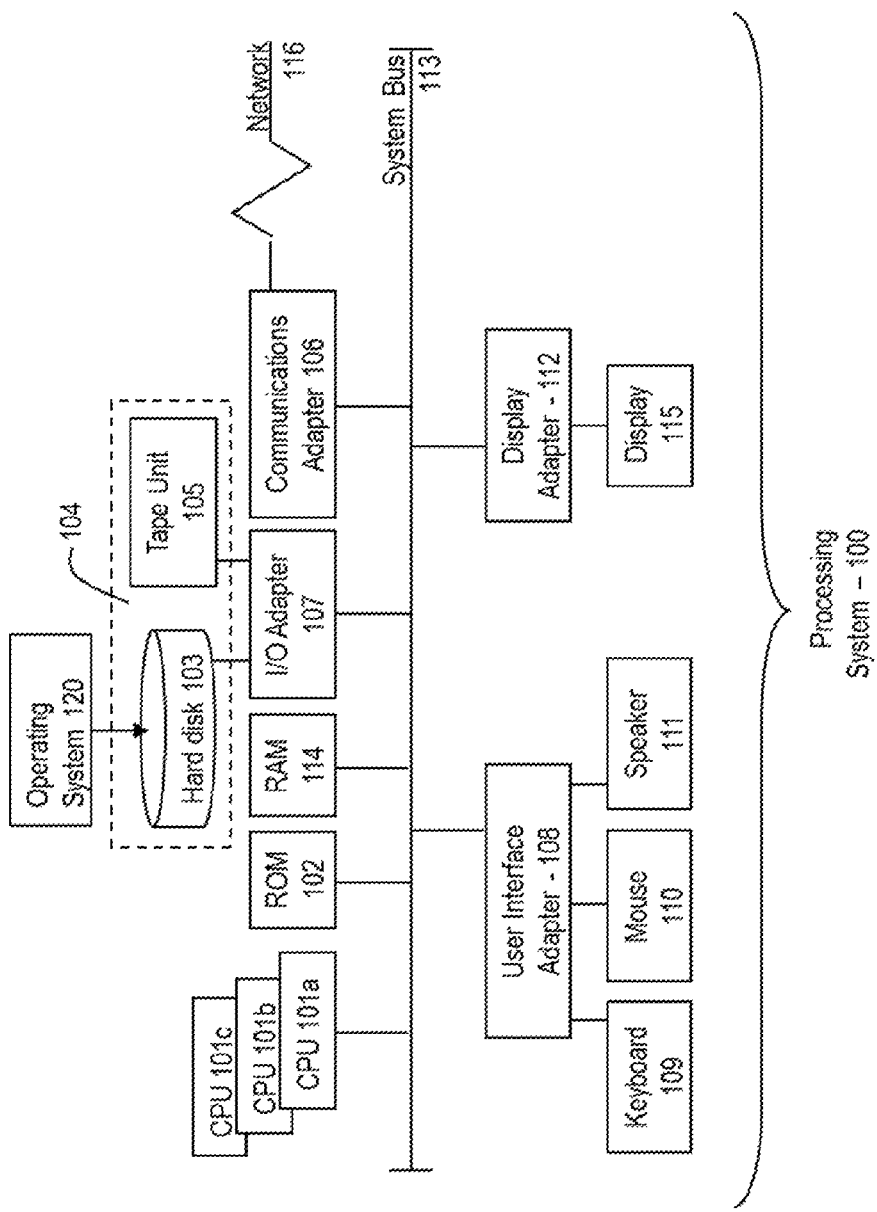
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
FIG. 2 is a schematic illustration of a personal electronic device in accordance with an embodiment.

Referring now to FIG. 2, a personal electronic device 200 in accordance with an embodiment is shown. As illustrated, the personal electronic device 200 includes a processor 202, a memory 204, a camera 206, and a user interface 208. The camera 206 captures images and/or videos that are stored by the processor 202 in the memory 204. In exemplary embodiments, the personal electronic device 200 can be a smartphone, a tablet, a processing system such as the one shown in FIG. 1, or any other suitable device.

In exemplary embodiments, the personal electronic device 200 is configured to capture and tag images and/or video for timed deletion. Traditionally, photographs are taken on smartphones using a shutter button located on the touchscreen, or using another part of the user interface 208. In one embodiment, when a user takes a photograph with a personal electronic device 200, the user can tag the photograph for automatic deletion by taking a specific action with the user interface 208 during the taking of the photograph or shortly thereafter. For example, the user interface 208 may include two buttons that can be used to take a photograph, one standard button and one tagged for deletion button. In another example, the user can indicate that the photograph should be tagged for deletion by holding down a specific button of the user interface 208 while taking the photograph (for example, holding down the volume up/down button while pressing the shutter button).

Figure 3:
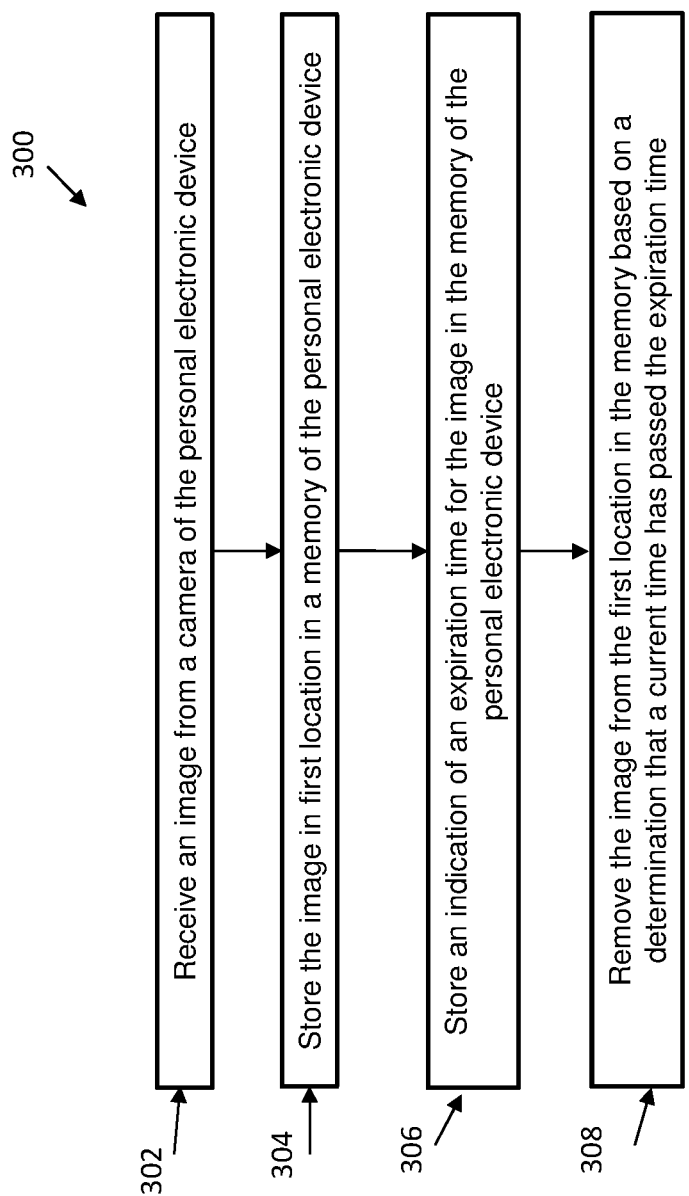
FIG. 3 is a flow chart illustrating a method for timed deletion of images from a personal electronic device in accordance with an embodiment.

Referring now to FIG. 3, a flowchart illustrating a method 300 for timed deletion of images from a personal electronic device is shown. As shown at block 302, the method 300 includes receiving an image from a camera of the personal electronic device. Next, as shown at block 304, the method 300 includes storing the image in a first location in a memory of the personal electronic device. In exemplary embodiments, the first location may be associated with a photographs folder or images folder on the personal electronic device. The method 300 also includes storing an indication of an expiration time for the image in the memory of the personal electronic device, as shown at block 306. In exemplary embodiments, the indication of an expiration time for the image in the memory of the personal electronic device is generated based on the photograph being captured using a predetermined function of a user interface of the personal electronic device. In exemplary embodiments, the indication may be stored as part of the image file or it may be stored in a separate file. Next, as shown at block 308, the method 300 includes removing the image from the first location in the memory based on a determination that a current time has passed the expiration time.

In exemplary embodiments, after the indication of the expiration time for the image in the memory of the personal electronic device is created and stored, the user is notified so that they can modify or remove the indication if the image is deemed important. In some embodiments, every image that is automatically deleted is sent to a "recently deleted" folder, where they will stay for set time period before being permanently deleted to ensure that no images are inadvertently deleted. In exemplary embodiments, images that have been tagged for automatic deletion are displayed using a visual indicator to convey that they are tagged for automatic deletion.

Figure 4:
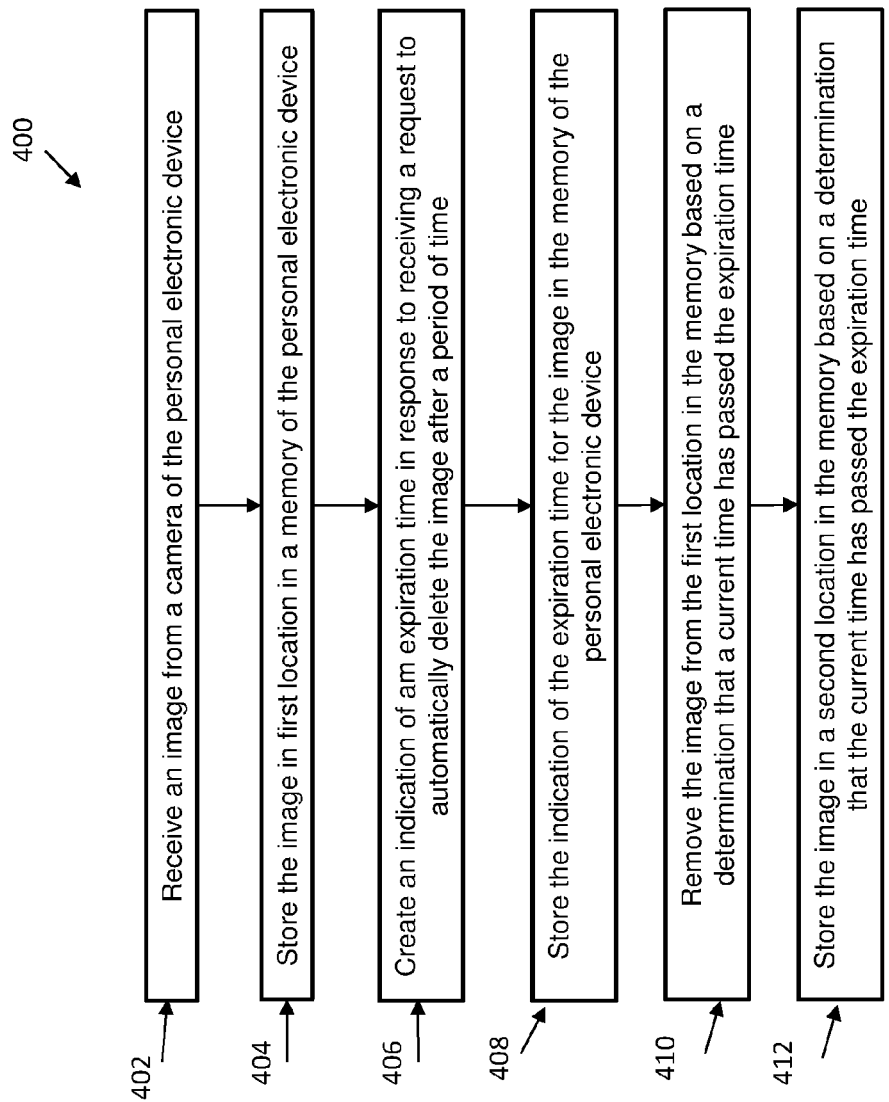
FIG. 4 is a flow chart illustrating another method for timed deletion of images from a personal electronic device in accordance with an embodiment.

Referring now to FIG. 4, a flowchart illustrating a method 400 for timed deletion of images from a personal electronic device is shown. As shown at block 402, the method 400 includes receiving an image from a camera of the personal electronic device. Next, as shown at block 404, the method 400 includes storing the image in a first location in a memory of the personal electronic device. In exemplary embodiments, the first location may be associated with a photographs folder or images folder on the personal electronic device. The method 400 also includes creating an indication of am expiration time in response to receiving a request to automatically delete the image after a period of time, as shown at block 406. In exemplary embodiments, the indication of an expiration time for the image in the memory of the personal electronic device is generated based on the photograph being captured using a predetermined function of a user interface of the personal electronic device. Next, as shown at block 408, the method 400 includes storing the indication of the expiration time for the image in the memory of the personal electronic device. In exemplary embodiments, the indication may be stored as part of the image file or it may be stored in a separate file.

Figure 5:
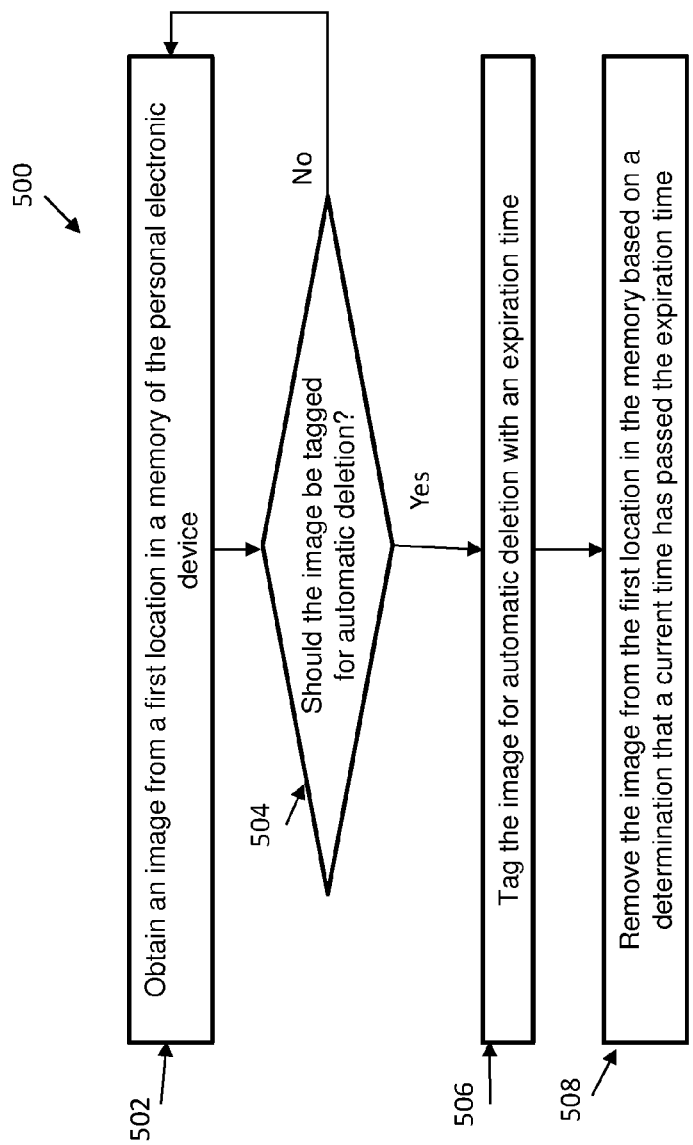
FIG. 5 is a flow chart illustrating a further method for timed deletion of images from a personal electronic device in accordance with an embodiment.

The method 400 also includes removing the image from the first location in the memory based on a determination that a current time has passed the expiration time, as shown at block 410. In exemplary embodiments, the personal electronic device includes settings that individuals can us to specify a time period after which images marked for deletion will be deleted. Next, as shown at block 412, the method 400 includes storing the image in a second location in the memory based on a determination that the current time has passed the expiration time Referring now to FIG. 5, a flowchart illustrating a method 500 for timed deletion of images from a personal electronic device is shown. As shown at block 502, the method 500 includes obtaining an image from a first location in a memory of the personal electronic device. Next, as shown at decision block 504, the method 500 includes determining if the image should be tagged for automatic deletion. In exemplary embodiments, the determination of whether an image should be tagged for automatic deletion can be based on an analysis of the contents of the image. If the image should be tagged for deletion, the method proceeds to block 506 and tags the image for automatic deletion with an expiration time. The expiration time is determined based on one or more settings of the personal electronic device, the date and time that the image was taken and/or the contents of the image. Next, as shown at decision block 508, the method 500 includes removing the image from the first location in the memory based on a determination that a current time has passed the expiration time.

In exemplary embodiments, the contents of an image stored on a personal electronic device can be analyzed to determine if the image should be marked for automatic deletion. In one embodiment, a picture-to-text algorithm can be used to extract the text from an image, and if the image includes dates that have all passed, the image can be tagged for automatic deletion. For example, the image could be tagged for automatic deletion on a date that is thirty days past the last date shown in the image.

In exemplary embodiments, the processor of the personal electronic device can analyze images stored in the memory of the personal electronic device will look for other indications that the image should be tagged for automatic deletion. Such indications can include handwritten notes, which may reflect an unnecessary image like a shopping list. Further, the processor of the personal electronic device can monitor what type of images are being deleted by the user by learning from manual deletes of pictures and learn characteristics of images that are usually deleted. As a result, the processor of the personal electronic device can use predictive analytics to suggest images for deletion in the future (for instance, if the user deletes screen shots frequently, they may be candidates for deletion suggestion).

In exemplary embodiments, by automatically deleting images that are no longer needed, the user of the personal electronic device will no longer need to manually review all of their images and figure out which ones are unnecessary and should be deleted in order to free up storage space on the device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for timed deletion of images from a personal electronic device, the method comprising:
   receiving, by a processing unit of the personal electronic device, an image from a camera of the personal electronic device;
   storing, by the processing unit, the image in a first location in a memory of the personal electronic device;
   storing, by the processing unit, an indication of an expiration time for the image in the memory of the personal electronic device; and
   removing, by the processing unit, the image from the first location in the memory based on a determination that a current time has passed the expiration time,
   wherein the indication of the expiration time is automatically created, by the processing unit, based on an analysis of a content of the image.

2. The computer-implemented method of claim 1, further comprising storing, by the processing unit, the image in a second location in the memory based on a determination that the current time has passed the expiration time.

3. The computer-implemented method of claim 2, wherein the second location in the memory is associated with a deleted items folder of the personal electronic device.

4. The computer-implemented method of claim 1, wherein removing the image from the first location comprises deleting the image from the memory of the personal electronic device.

5. The computer-implemented method of claim 1, wherein the analysis of the content of the image includes an optical character recognition.

6. The computer-implemented method of claim 1, wherein the analysis of the content of the image includes a comparison of the content of the image to a content type of one or more previously deleted images.

7. A computer program product for timed deletion of images from a personal electronic device, the computer program product comprising:
   a non-transitory storage medium readable by a processing circuit and storing instructions for execution by the processing circuit for performing a method comprising:
   receiving an image from a camera of the personal electronic device;
   storing the image in a first location in a memory of the personal electronic device;
   storing an indication of an expiration time for the image in the memory of the personal electronic device; and
   removing the image from the first location in the memory based on a determination that a current time has passed the expiration time,
   wherein the indication of the expiration time is automatically created, by the processing circuit, based on an analysis of a content of the image.

8. The computer program product of claim 7, wherein the method further comprises storing the image in a second location in the memory based on a determination that the current time has passed the expiration time.

9. The computer program product of claim 8, wherein the second location in the memory is associated with a deleted items folder of the personal electronic device.

10. A personal electronic device comprising a memory and a camera that are in communication with a processing unit, the processing unit configured to:
    receive an image from the camera;
    store the image in a first location in the memory;
    store an indication of an expiration time for the image in the memory; and
    remove the image from the first location in the memory based on a determination that a current time has passed the expiration time,
    wherein the indication of the expiration time is automatically created, by the processing circuit, based on an analysis of a content of the image.

11. The personal electronic device of claim 10, wherein the processing unit is further configured to store the image in a second location in the memory based on a determination that the current time has passed the expiration time.

12. The personal electronic device of claim 11, wherein the second location in the memory is associated with a deleted items folder of the personal electronic device.

* * * * *